(12) United States Patent
Finch et al.

(10) Patent No.: US 7,947,748 B2
(45) Date of Patent: May 24, 2011

(54) METHOD FOR PRODUCING POLYMER BEADS OF UNIFORM SIZE

(75) Inventors: John David Finch, North Wales, PA (US); Biwang Jiang, Warrington, PA (US); Aaron Sarafinas, Ivyland, PA (US); Andrew M. Savo, Cherry Hill, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 396 days.

(21) Appl. No.: 12/317,768

(22) Filed: Dec. 29, 2008

(65) Prior Publication Data

US 2009/0176897 A1    Jul. 9, 2009

Related U.S. Application Data

(60) Provisional application No. 61/010,444, filed on Jan. 9, 2008.

(51) Int. Cl.
*B01J 39/20*    (2006.01)

(52) U.S. Cl. .................. 521/38; 521/29; 521/30; 521/31

(58) Field of Classification Search .............. 521/29–31, 521/38
See application file for complete search history.

(56) References Cited

U.S. PATENT DOCUMENTS

| | | | |
|---|---|---|---|
| 3,922,255 A | 11/1975 | Koestler et al. |
| 4,427,794 A | 1/1984 | Lange et al. |
| 4,444,961 A | 4/1984 | Timm |
| 6,365,683 B2 | 4/2002 | Podszun et al. |

*Primary Examiner* — Edward J Cain
(74) *Attorney, Agent, or Firm* — Kenneth Crimaldi

(57) ABSTRACT

A method for preparing monodisperse crosslinked bead polymers by introducing droplets having a harmonic mean size from 50 to 1500 microns and comprising at least one monomer, at least one crosslinker and a free-radical polymerization initiator into an aqueous medium through orifices to produce an aqueous suspension of droplets having a volume fraction of droplets from 35 to 64%; wherein the droplets are not encapsulated; causing the aqueous suspension of droplets to flow in a downward direction in a pipe in which the temperature is maintained at least 20° C. below the temperature at which the polymerization initiator has a half-life of 1 hour; and polymerizing the droplets in a reactor.

10 Claims, No Drawings

METHOD FOR PRODUCING POLYMER BEADS OF UNIFORM SIZE

This application claims the benefit of priority under 35 U.S.C. §119(e) of U.S. Provisional Patent Application No. 61/010,444 filed on Jan. 9, 2008.

This invention relates to a method for producing polymer beads having a substantially uniform particle size distribution. Such beads are useful in manufacture of ion exchange resins.

Polymer beads having a substantially uniform particle size distribution can be manufactured by "jetting" liquid organic monomer mixtures through orifices into an aqueous phase. The suspended monomer droplets are then transported to a reactor where polymerization occurs. The problem of droplet coalescence, which leads to less uniform size distributions, especially with downward flow, has been solved in various ways, including jetting directly into the reactor, and partially polymerizing or encapsulating the droplets to retard coalescence. For example, U.S. Pat. No. 3,922,255 teaches partially polymerizing the droplets prior to downward flow into a reactor.

The problem addressed by this invention is to provide an improved process for producing polymer beads by a jetting process with downward flow to the reactor, and without partial polymerization or encapsulation.

STATEMENT OF THE INVENTION

The present invention is directed to a method for preparing monodisperse crosslinked bead polymers comprising:

(a) introducing droplets having a harmonic mean size from 50 to 1500 microns and comprising at least one monomer, at least one crosslinker and a free-radical polymerization initiator into an aqueous medium through orifices to produce an aqueous suspension of droplets having a volume fraction of droplets from 35 to 64%; wherein the droplets are not encapsulated;

(b) causing the aqueous suspension of droplets to flow in a downward direction in a pipe such that: (i) a ratio of droplet harmonic mean size to inside pipe diameter is from 0.001 to 0.035; (ii) mean linear flow velocity is from 0.5 to 2.5 ft/s (0.15 to 0.75 m/s); and (iii) temperature is maintained at least 20° C. below a temperature at which the polymerization initiator has a half-life of 1 hour; and (c) polymerizing the droplets in a reactor.

DETAILED DESCRIPTION OF THE INVENTION

Percentages are weight percentages, unless specified otherwise. As used herein the term "(meth)acrylic" refers to acrylic or methacrylic. Monomers useful in this invention include monoethylenically unsaturated compounds and multiethylenically unsaturated monomers, i.e., crosslinkers, including, e.g., divinylaromatic compounds, trivinylcyclohexane, di- and tri-(meth)acrylate compounds and divinyl ether compounds. One preferred crosslinker is a divinylaromatic crosslinker, e.g., divinylbenzene. Monoethylenically unsaturated monomers include, e.g., (meth)acrylic acids and their esters, styrene, chloro- and/or methyl-substituted styrenes, vinylpyridines, and vinyl esters, ethers and ketones. Monomers which are sufficiently insoluble in an aqueous phase are preferred, although more water-soluble monomers can also be used by adding salts like NaCl or $Na_2SO_4$ into aqueous phase to reduce the solubility of monomer phase in the aqueous phase. The term "styrenic polymer" indicates a copolymer polymerized from monomers comprising a styrene monomer (substituted or unsubstituted styrene, e.g., styrene, α-methylstyrene, ethylstyrene) and/or at least one crosslinker, wherein the combined weight of styrene and crosslinkers is at least 50 weight percent of the total monomer weight. In some embodiments, a styrenic polymer is made from a mixture of monomers that is at least 75% styrene and crosslinkers, more preferably at least 90% styrene and divinylaromatic crosslinkers, and most preferably from a mixture of monomers that consists essentially of styrene and at least one divinylaromatic crosslinker. In other embodiments, a styrenic polymer is made from a monomer mixture consisting essentially of at least one divinylaromatic crosslinker. The term "acrylic polymer" indicates a copolymer formed from a mixture of vinyl monomers containing at least one (meth)acrylic acid or ester, or (meth)acrylonitrile, along with at least one crosslinker, wherein the combined weight of the (meth)acrylic acid(s) or ester(s) or (meth)acrylonitrile and the crosslinker(s) is at least 50 weight percent of the total monomer weight; preferably at least 75%, more preferably at least 90%, and most preferably from a mixture of monomers that consists essentially of at least one (meth)acrylic acid or ester and at least one crosslinker. In some embodiments, a (meth)acrylic acid ester is a $C_1$-$C_4$ alkyl ester.

The term "gel" resin applies to a resin which was synthesized from a very low porosity (0 to 0.1 $cm^3$/g), small average pore size (0 to 17 Å) and low B.E.T. surface area (0 to 10 $m^2$/g) copolymer. The term "macroreticular" (or MR) resin is applied to a resin which is synthesized from a high mesoporous copolymer with higher surface area than the gel resins. The total porosity of the MR resins is between 0.1 and 0.7 $cm^3$/g, average pore size between 17 and 500 Å and B.E.T. surface area between 10 and 200 $m^2$/g. MR resins typically are made by incorporating an organic solvent ("porogen") into the monomer mixture. The term adsorbent resin is applied to a resin which can be functionalized or not, and which has very high surface area and porosity. These adsorbents have surface area between 200 and 1300 $m^2$/g, average pore size between 17 and 1000 Å and total porosity between 0.7 and 200 $cm^3$/g.

Suitable polymerization initiators in the monomer phase include, e.g., benzoyl peroxide, tert-butyl hydroperoxide, cumene peroxide, tetralin peroxide, acetyl peroxide, caproyl peroxide, tert-butyl perbenzoate, tert-butyl diperphthalate, and methyl ethyl ketone peroxid. Azo initiators are also useful as catalysts. Useful azo initiators include, e.g., 2,2'-azobisisobutyronitrile and 2,2'-azobis(2,4-dimethylpentanenitrile), which is commercially available under the trade name VAZO 52 from DuPont, Wilmington, Del. A typical effective amount of organic initiator relative to dry monomer was found to be about 0.5 to about 2% by weight, preferably about 0.8 to about 1.5% by weight.

Organic droplets comprising at least one monomer are formed through orifices in a drop generator by generally known methods, including vibrational jetting and natural jetting. The monomer flow rates can vary from 5 ml/hr/hole to 1000 ml/hr/hole, and are typically from 50 ml/hr/hole to 250 ml/hr/hole. The frequency of vibration of the droplet generator can be from 10 Hz to 20,000 Hz using commercially available vibratory exciters, and as high as 500,000 Hz if piezoelectric exciters are used. Typical frequencies of vibration are from 400 Hz-2500 Hz. Typical orifice diameters are from 20 microns to 1000 microns, alternatively from 30 microns to 600 microns. The droplets are jetted into an aqueous composition in a formation column, then transported through a downward-flowing transfer line, or conduit, to a reactor. In some embodiments of the invention, the droplets are jetted upwards into the formation column, then re-directed, e.g., via a U-tube or elbow, to downward flow, followed by another re-direction, this time to upward flow into a reactor. In some embodiments of the invention, the flow from the formation column makes a turn into a substantially horizontal line, then another turn into the downward transfer line. Typically, the downward transfer line is no more than 20 degrees from vertical, alternatively no more than 10 degrees. Preferably, the volume fraction of the droplets exiting the formation column is at least 38%, alternatively at least 40%, alternatively at least 42%; preferably the volume fraction is no greater than 63%, alternatively no greater than 60%, alternatively no greater than 58%, alternatively no greater than 55%, alternatively no greater than 50%, alternatively no greater than 47%. Close packing of uniform spherical droplets corresponds to a 65% volume fraction, which typically causes coalescence and poor product quality.

It has now been surprisingly found that substantially unpolymerized monomer droplets can be transferred using downward flow under certain conditions without causing coalescence or drop breakup, and without the use of costly and more complicated treatment in encapsulation columns or partial polymerization columns. Downward flow allows more flexibility in location of process equipment than upflow transfer of monomer droplets from the formation column to the reactor. This process allows a reactor to be set up at a lower level position (either parallel to, diagonal to, or below a jetting unit). Such a design significantly reduces the capital cost of set up and operation of the process, and facilitates jetting into multiple reactors. In particular there is an advantage in retrofitting existing suspension polymerization plants to jetting plants because the downflow feed does not require the relocation of the existing reactors that would be required by use of upflow feed. Encapsulation is the production of shells which protect the droplets, as described, e.g., in U.S. Pat. No. 4,427,794. Coacervation is an encapsulation process in which a shell is formed, and then set by cooling the droplets below the gelation temperature of the shell. In some cases, the shells are chemically hardened as well, e.g., with formaldehyde (see, e.g., U.S. Pat. No. 2,800,458). Complex coacervation is an encapsulation process using differently charged colloids (polyelectrolytes) to form a shell.

The ratio of average droplet diameter to the inside diameter of the downward flow pipe is from 0.001 to 0.035, e.g., a 200 micron average droplet diameter in a 1 inch (25.4 mm) inside diameter pipe gives a ratio of $200(10^{-6})$ m/$25.4(10^{-3})$ m=0.00787. In some embodiments of the invention, the ratio is at least 0.002, alternatively at least 0.003, alternatively at least 0.004, alternatively at least 0.005. In some embodiments of the invention, the ratio is no greater than 0.032, alternatively no greater than 0.03, alternatively no greater than 0.028, alternatively no greater than 0.025, alternatively no greater than 0.023, alternatively no greater than 0.02.

The mean linear flow velocity of the aqueous suspension of droplets in the downward flow pipe is from 0.5 to 2.5 ft/s (0.15 to 0.75 m/s). The mean linear flow velocity is an average of the aqueous and organic phase velocities. In some embodiments of the invention, the mean linear flow velocity is at least 0.6 ft/s (0.18 m/s), alternatively at least 0.7 ft/s (0.21 m/s). In some embodiments of the invention, the mean linear flow velocity is no greater than 2.2 ft/s (0.66 m/s), alternatively no greater than 2 ft/s (0.6 m/s), alternatively no greater than 1.9 ft/s (0.57 m/s), alternatively no greater than 1.8 ft/s (0.54 m/s), alternatively no greater than 1.7 ft/s (0.51 m/s). In some embodiments of the invention, the downward flow pipe has a diameter from 0.75 in (1.9 cm) to 6 in (15.2 cm), alternatively from 0.75 in (1.9 cm) to 4 in (10.2 cm), alternatively from 0.75 in (1.9 cm) to 3 in (7.62 cm), alternatively from 1 in (2.54 cm) to 3 in (7.62 cm). Velocities in the jetting unit (formation column), which typically has a larger diameter than the downward transfer pipe, will be lower than the above values, but are not critical.

The temperature in the downflow pipe is maintained at least 20° C. below a temperature at which the polymerization initiator has a half-life of 1 hour. This assures that little or no polymerization of monomers occurs in the organic droplets by greatly limiting the concentration of free radicals generated by the initiator. In some embodiments of the invention, the temperature is maintained at least 25° C. below the temperature at which the polymerization initiator has a half-life of 1 hour, alternatively at least 30° C. below. In some embodiments of the invention, the temperature is at least 5° C., alternatively at least 10° C., alternatively at least 15° C.

Typically the aqueous phase contains a colloidal stabilizer and a viscosity modifier. Examples of colloidal stabilizers known to those skilled in the art are proteins such as gelatin, soy protein, hydrolyzed soy protein, wheat protein, spirulina, and rice protein; polysaccharides such as hydroxyethylcellulose, methylhydroxyethylcellulose, hydroxypropylmethylcellulose, carboxymethylcellulose, pectin, xanthan gum, gellan gum, sodium lignosulfonate, agar, carrageenan, sodium alginate, starch, gum arabic, and gum tragacanth. Examples of viscosity modifiers are polyvinylalcohol, polyvinylpyrrolidone, polyvinylcaprolactam, polyacrylic acid, polydimethyldiallyl ammonium chloride, hydrolyzed poly(styrene-co-maleic anhydride), and hydrolyzed poly(methylvinylether-co-maleic anhydride). Other additives such as surfactants, buffers, and aqueous inhibitors can also be added. Preferably, the colloidal stabilizer in the aqueous phase is a naturally occurring or synthetic water-soluble polymer which forms a film around the monomer droplets having an interfacial tension of at least 3 dynes/cm$^2$, alternatively at least 8 dynes/cm$^2$, and without phase changes or formation of covalent bonds. In contrast, encapsulation processes involve phase changes such as gelation caused by lowering temperature or by addition of polyvalent ions or electrolytes; or covalent bond formation, e.g., from reaction with formaldehyde. Encapsulated drops typically are stable over long periods of time, while the drops in the present invention can be unstable. Especially preferred colloidal stabilizers include, e.g., polyacrylic acid with Type A gelatin, polydimethyldiallylammonium chloride with Type A gelatin, carboxymethyl cellulose, carboxymethylcellulose with hydroxypolyethylene alkylphenol and polyether phosphate ester, hydroxypropyl methylcellulose, hydroxypropyl methylcellulose with hydroxypolyethylene alkylphenol and polyether phosphate ester, methylhydroxyethylcellulose. Preferably, the total amount of colloidal stabilizers in the aqueous phase is from 0.05% to 1%, alternatively from 0.05% to 0.5%.

In one embodiment of the invention, aqueous compositions are tested for suitability using a "shake test," in which an eight-ounce (225 mL) jar is charged with ca. 28 mL of the monomer composition and ca. 115 mL of the aqueous composition, fastened to a motor shaft arm and rotated at 1 revolution/sec for 15 seconds. The contents of the jar are then poured into a graduated cylinder. The aqueous phase composition is suitable if no more than 2 mL of monomer composition separates after 3 minutes.

The aqueous phase in the reactor typically has a higher concentration of suspension stabilizer than the aqueous phase in the formation column and conduit. This is accomplished by introduction of a concentrated aqueous material ("a heel") directly into the reactor. Preferably, the aqueous phase in the reactor contains colloidal stabilizers in a total amount from 0.5% to 8%, alternatively from 2% to 4%.

An alternative method of achieving the higher concentration of suspension stabilizer in the reactor is to feed a concentrated aqueous stream either directly to the top of the reactor or to the transfer line. The concentrated aqueous stream is fed at a flow rate such that the concentration of the colloidal stabilizers remain constant throughout the fill in a total amount from 0.25% to 8%, alternatively from 0.5 % to 2%.

The harmonic mean size of the droplets is from 50 to 1500 microns. In some embodiments of the invention, the harmonic mean size is at least 100 microns, alternatively at least 150 microns. In some embodiments of the invention, the harmonic mean size is no greater than 1000 microns, alternatively no greater than 900 microns, alternatively no greater than 800 microns.

In some embodiments of the invention, the harmonic mean size of the droplets is from 100 to 200 microns. In these embodiments, for gel copolymer the ratio of average droplet diameter to inside diameter of the downflow pipe is from 0.002 to 0.016, alternatively from 0.005 to 0.0012; and the mean linear flow velocity is from 0.71 to 1.70 ft/s (0.22 to 0.52 m/s), alternatively from 0.95 to 1.45 ft/s (0.29 to 0.44 m/s).

In some embodiments of the invention, the harmonic mean size of the droplets for gel copolymer is from 200 to 400 microns. In these embodiments, for gel copolymer the ratio of average droplet diameter to inside diameter of the downflow pipe is from 0.004 to 0.026, alternatively from 0.01 to 0.021; and the mean linear flow velocity is from 0.72 to 2.05 ft/s (0.22 to 0.63 m/s), alternatively from 1.05 to 1.90 ft/s (0.34 to 0.58 m/s).

In some embodiments of the invention, the harmonic mean size of the droplets for gel copolymer is from 400 to 600 microns. In these embodiments, for gel copolymer the ratio of average droplet diameter to inside diameter of the downflow pipe is from 0.008 to 0.031, alternatively from 0.014 to 0.026; and the mean linear flow velocity is from 0.77 to 2.29 ft/s (0.23 to 0.70 m/s), alternatively from 1.14 to 1.90 ft/s (0.34 to 0.58 m/s).

In some embodiments of the invention, the harmonic mean size of the droplets for gel copolymer is from 600 to 800 microns. In these embodiments, for gel copolymer the ratio of average droplet diameter to inside diameter of the downflow pipe is from 0.012 to 0.031, alternatively from 0.017 to 0.027; and the mean linear flow velocity is from 0.86 to 2.36 ft/s (0.26 to 0.72 m/s), alternatively from 1.23 to 1.98 ft/s (0.37 to 0.60 m/s).

In some embodiments of the invention, the harmonic mean size of the droplets for MR copolymer is from 100 to 200 microns. In these embodiments, for gel copolymer the ratio of average droplet diameter to inside diameter of the downflow pipe is from 0.002 to 0.016, alternatively from 0.005 to 0.012; and the mean linear flow velocity is from 0.84 to 1.91 ft/s (0.26 to 0.58 m/s), alternatively from 1.11 to 1.64 ft/s (0.34 to 0.50 m/s).

In some embodiments of the invention, the harmonic mean size of the droplets for MR copolymer is from 200 to 400 microns. In these embodiments, for gel copolymer the ratio of average droplet diameter to inside diameter of the downflow pipe is from 0.004 to 0.026, alternatively from 0.01 to 0.021; and the mean linear flow velocity is from 0.86 to 2.28 ft/s (0.26 to 0.70 m/s), alternatively from 1.21 to 1.92 ft/s (0.37 to 0.58 m/s).

In some embodiments of the invention, the harmonic mean size of the droplets for MR copolymer is from 400 to 600 microns. In these embodiments, for gel copolymer the ratio of average droplet diameter to inside diameter of the downflow pipe is from 0.008 to 0.028, alternatively from 0.013 to 0.023; and the mean linear flow velocity is from 0.94 to 2.33 ft/s (0.29 to 0.71 m/s), alternatively from 1.28 to 1.98 ft/s (0.39 to 0.60 m/s).

In some embodiments of the invention, the harmonic mean size of the droplets for MR copolymer is from 600 to 800 microns. In these embodiments, for gel copolymer the ratio of average droplet diameter to inside diameter of the downflow pipe is from 0.012 to 0.028, alternatively from 0.015 to 0.023; and the mean linear flow velocity is from 1.08 to 2.45 ft/s (0.33 to 0.74 m/s), alternatively from 1.43 to 2.14 ft/s (0.43 to 0.65 m/s).

One measure of particle size uniformity is the uniformity coefficient (UC), which is calculated as:

$$UC = d_{60}/d_{10}$$

where $d_{60}$ is the particle diameter at which 60% of the particles by volume have a smaller diameter, and $d_{10}$ is the particle diameter at which 10% of the particles by volume have a smaller diameter. Preferably, UC is no more than 1.3, alternatively no more than 1.25, alternatively no more than 1.2, alternatively no more than 1.15, alternatively no more than 1.10.

The uniform drops are typically generated by imposing a periodic disturbance on a jet of monomer. This can be performed by vibrating the monomer, see e.g., U.S. Pat. No. 4,444,961, or by vibrating the aqueous phase near the monomer, or by vibrating the orifice itself, see e.g., U.S. Pat. No. 4,623,706. Larger scale vibrating drop generators include many holes and in this case a large chamber can be vibrated, see e.g., U.S. Pat. No. 4,666,673, or an orifice plate containing many holes may be vibrated. The vibration can be in any direction but is typically axial or perpendicular to axial.

The reactor agitation system used is known to those skilled in the art of suspension polymerization. The system needs sufficient flow to suspend the drops to provide good heat transfer and avoid coalescence and clustering while not breaking the drops. Impellers such as hydrofoils, pitched blade turbines, flat blade turbines, retreat curve impellers, and gate impellers have been used. Multiple impellers with large impeller diameter to tank diameter ratios are preferred. These impellers maximize the flow in the reactor to avoid allowing the droplets to float in a stagnant layer while they also avoid high energy dissipation which leads to drop break-up. Balanced spacing of the multiple impellers avoids locally high energy dissipation which will lead to local drop break-up. Fully baffled (i.e., with optimal power input) and partially baffled reactors have been successfully used in these suspension polymerizations. Baffle types include flat plates, oval baffles, pipes, beaver-tail baffles, among other common baffle designs. Proper baffle selection and design helps optimize the flow while avoiding local high energy dissipation which will lead to local drop break-up. Liquid height-to-tank diameter ratios at the end of the fill both above and below 1 have been successfully demonstrated in the process. Liquid height-to-tank diameter ratios above 1 are preferred at the end of the fill both for heat transfer and multiple impeller flow and power effects.

In some embodiments of the invention, the polymerized droplets are functionalized as ion exchange resins by known methods. For example, styrenic beads can be sulfonated to produce sulfonic acid resins, or chloromethylated to produce chloromethyl functional groups which can be reacted further with amines, aminoalcohols, aminodicarboxylic acids, etc. to form amines, quaternary salts and other functionalities;

acrylic beads can be functionalized by reaction of (meth) acrylic acids with alcohols or amines.

EXAMPLES

Example #1

Gel Cation

Gel copolymer beads of uniform particle size were produced by charging an aqueous heel containing 2.7 wt % poly(diallyldimethylammonium chloride) (assay 15%), 0.016 wt % $NaNO_2$, and 0.23 wt % gelatin in a boric acid and caustic buffer to the reactor. A second jetting aqueous phase consisting of 0.1 wt % 250 BLOOM Type A gelatin, 0.007 wt % $NaNO_2$ and a boric acid and caustic buffer was used to fill the formation column and the transfer line. A monomer phase consisting of 80.4 wt % styrene, 19 wt % divinylbenzene (assay 55%), 0.32 wt % di-(4-tert-butylcyclohexyl)peroxydicarbonate, 0.3 wt % benzoyl peroxide was fed to the monomer droplet generator at a monomer flow rate of 160 ml/hr/hole. The droplet generator contained several thousand 150 micron holes vibrationally excited at 986 Hz. In this case the droplet generator consisted of a bowl on which a removable orifice plate was sealed using o-rings. The entire bowl and orifice plate were located inside the formation column. The bowl and orifice plate were attached to a push-rod which exited the base of the formation column through a gland sealed with o-rings. The push-rod was attached to a modal exciter. The modal exciter vibrated the entire push rod, bowl, and orifice plate axially at the required amplitude and frequency. The total monomer flow rate was 770 lb/hr (350 kg/hr). The aqueous feed was fed to the formation column at a flow rate of 1.6 gal/min (0.36 m³/hr). During the startup the transfer line was filled and purged of any gases through a valve. Any unsteady state material was discarded through the valve. When steady state was achieved, valve was closed and the drop dispersion was fed to the reactor under agitation sufficient to suspend the droplets without resizing the droplets. The fill was performed under a 3.5 psig (125.1 kPa absolute) reactor pressure to compensate for the siphon of the downward flow. The reactor was fed downflow through the 1.0" (0.025 m) transfer line for 5.9 hr to reach a 40% volume of drops. This feed downflow through the transfer line was performed at 30° C., below the polymerization reaction temperature. This corresponds to a drop diameter/pipe diameter ratio of 0.017 and a mean linear velocity of 1.39 ft/s (0.42 m/s). In order to keep the concentration of the suspending agents in the aqueous phase constant at 2.7 wt % poly(diallyldimethylammonium chloride) and 0.23 wt % gelatin an additional stream of 11 wt % poly(diallyldimethylammonium chloride), 0.04 wt % $NaNO_2$, and 0.64 wt % gelatin in a boric acid and caustic buffer was fed to the top of the kettle at 4.4 lb/min (2.0 kg/min) during the fill. The reactor was then heated to reaction temperature and polymerized to >95% conversion of monomer to polymer. Agitation was supplied using a pitched blade turbine. After separating the copolymer beads from the aqueous phase and washing the beads the following properties were obtained: HMS 0.428 mm, and a uniformity coefficient of 1.04. The copolymer was sulfonated to make a strong acid cation exchange resin with the following properties: Perfect Bead >99%, Moisture Holding Capacity: 46.8%, Weight Capacity: 5.15 meq/g, Volume Capacity: 2.04 meq/ml, HMS: 0.580 mm, and uniformity coefficient of 1.10.

Example #2

Gel Anion

Gel copolymer beads of uniform particle size were produced by charging an aqueous heel containing 2.7 wt % poly(diallyldimethylammonium chloride) (assay 15%), 0.016 wt % $NaNO_2$, and 0.23 wt % gelatin in a boric acid and caustic buffer to the reactor. A second jetting aqueous phase consisting of 0.1 wt % 250 BLOOM Type A gelatin, 0.007 wt % $NaNO_2$ and a boric acid and caustic buffer was used to fill the formation column and the transfer line. A monomer phase consisting of 92.7 wt % styrene, 6.9 wt % divinylbenzene (assay 63%), and 0.3 wt % benzoyl peroxide was fed to the monomer droplet generator at a monomer flow rate of 140 ml/hr/hole. The droplet generator contained several thousand 220 micron holes vibrationally excited at 952 Hz. The total monomer flow rate was 770 lb/hr (350 kg/hr). The aqueous feed was fed to the formation column at a flow rate of 1.6 gal/min (0.36 m³/hr). During the startup the transfer line was filled and purged of any gases through a valve. Any unsteady state material was discarded through the valve. When steady state was achieved, valve was closed and the drop dispersion was fed to the reactor under agitation sufficient to suspend the droplets without resizing the droplets. The fill was performed under a 3.5 psig (124.1 kPa absolute) reactor pressure to compensate for the siphon of the downward flow. The reactor was fed downflow through the 1.0" (0.025 m) transfer line for 6.5 hr to reach a 40% volume of drops. This feed downflow through the transfer line was performed at 30° C., below the polymerization reaction temperature. This corresponds to a drop diameter/pipe diameter ratio of 0.016 and a mean linear velocity of 1.3 ft/s (0.39 m/s). In order to keep the concentration of the suspending agents in the aqueous phase constant at 2.7 wt % poly(diallyldimethylammonium chloride) and 0.23 wt % gelatin an additional stream of 11 wt % poly(diallyldimethylammonium chloride), 0.04 wt % $NaNO_2$, and 0.64 wt % gelatin in a boric acid and caustic buffer was fed to the top of the kettle at 3.8 lb/min (1.7 kg/min) during the fill. The reactor was then heated to reaction temperature and polymerized to >95% conversion of monomer to polymer. After separating the copolymer beads from the aqueous phase and washing the beads the following properties were obtained: HMS 0.444 mm, and a uniformity coefficient of 1.05. The copolymer was chloromethylated and aminated to make a strong base anion exchange resin with the following properties: Perfect Bead 97%, Moisture Holding Capacity: 52.3%, Weight Capacity: 4.00 meq/g, Volume Capacity: 1.34 meq/ml, HMS: 0.673 mm, and uniformity coefficient of 1.09

Example #3

MR Anion

Gel copolymer beads of uniform particle size were produced by charging an aqueous heel containing 2.7 wt % poly(diallyldimethylammonium chloride) (assay 15%), 0.016 wt % $NaNO_2$, and 0.23 wt % gelatin in a boric acid and caustic buffer to the reactor. A second jetting aqueous phase consisting of 0.1 wt % 250 BLOOM Type A gelatin, 0.007 wt % $NaNO_2$ and a boric acid and caustic buffer was used to fill the formation column and the transfer line. A monomer phase consisting of 55.1 wt % styrene, 2.95 wt % divinylbenzene (assay 63%), 41.2 wt % of 4-methyl-2-pentanol and 0.76 wt % benzoyl peroxide (assay 75%) was fed to the monomer droplet generator at a monomer flow rate of 300 ml/hr/hole. The droplet generator contained several thousand 300 micron holes vibrationally excited at 400 Hz. The total organic flow rate was 2027 lb/hr (922 kg/hr). The aqueous feed was fed to the formation column at a flow rate of 3.3 gal/min (0.76 m³/hr). During the startup the 1.5" transfer line was filled and purged of any gases through a valve. Any unsteady state material was discarded through valve. When steady state was achieved, valve was closed and the drop dispersion was fed to the reactor under agitation sufficient to suspend the droplets without resizing the droplets. The fill was performed under a 3.5 psig (125.1 kPa absolute) reactor pressure to compensate for the siphon of the downward flow. The reactor was fed downflow through the transfer line for 4.4 hr to reach a 52% volume of drops. This feed downflow through the transfer line was performed at 30° C., below the polymerization reaction temperature. In order to keep the concentration of the suspending agents in the aqueous phase constant at 2.7 wt % poly(diallyldimethylammonium chloride) and 0.23 wt % gelatin an additional stream of 11 wt % poly(diallyldimethylammonium chloride), 0.04 wt % $NaNO_2$, and 0.64 wt % gelatin in a boric acid and caustic buffer was fed to the transfer line of the kettle at 1.04 lb/min (0.24 m³/hr) during the fill. This corresponds to a drop diameter/pipe diameter ratio of 0.019 and a mean linear velocity of 1.63 ft/s (0.49 m/s). The reactor was then heated to reaction temperature and polymerized to >95% conversion of monomer to polymer. The reactor was then heated to 100° C. to remove the 4-methy-2-pentanol by distillation. After separating the copolymer beads from the aqueous phase, washing the beads, and drying the beads the following properties were obtained: HMS 0.614 mm, and a uniformity coefficient of 1.14. The copolymer was chloromethylated and aminated with dimethylethanolamine to make a strong base anion exchange resin with the following properties: Perfect Bead 97%, Moisture Holding Capacity: 55.9%, Weight Capacity: 3.84 meq/g, Volume Capacity: 1.15 meq/ml, HMS: 0.978 mm, and uniformity coefficient of 1.12.

Example #4

Preparation and Testing of Aqueous Phase

An aqueous phase was made up containing:

| | |
|---|---|
| City Water: | 966.9 g |
| Boric Acid | 1.5 g |
| NaOH (50%) | 1.9 g |
| $NaNO_2$ | 0.9 g |
| Polydimethyldiallylammonium chloride (15%) | 26.7 g |
| 250 BLOOM Type A gelatin | 2.0 g |

The first five components were mixed at room temperature under agitation. A portion of the water was heated to 45° C.+/−5° C. and the Type A Gelatin was added slowly to dissolve under agitation. This gelatin mixture was then charged to the remaining components, and the system was pH adjusted to 10-11

A monomer phase was made up consisting of

| | |
|---|---|
| Styrene: | 404.5 g |
| DVB (55%) | 95.4 g |
| T-butylcyclohexylperoxydicarbonate | 1.6 g |
| Benzoyl peroxide (75%) | 2.0 g |

1 oz (28.4 g) of the monomer phase was mixed with 4 oz (113.4 g) of heated (63° C.) aqueous phase in a heated (63° C.) shake test jar and mixed for 15 seconds at 60 rpm. After transfer to a polymeric graduated cylinder there was less than 1 mL of coalesced monomer after 3 minutes.

These phases were then used as the final reactor composition in Example 1. The final copolymer had the following properties before screening:

| | |
|---|---|
| Harmonic Mean Size: | 435 microns |
| Uniformity Coefficient: | 1.04 |

The invention claimed is:

1. A method for preparing monodisperse crosslinked bead polymers comprising:
   (a) introducing droplets having a harmonic mean size from 50 to 1500 microns and comprising at least one monomer, at least one crosslinker and a free-radical polymerization initiator into an aqueous medium through orifices to produce an aqueous suspension of droplets having a volume fraction of droplets from 35 to 64%; wherein the droplets are not encapsulated;
   (b) causing the aqueous suspension of droplets to flow in a downward direction in a pipe such that: (i) a ratio of droplet harmonic mean size to inside pipe diameter is from 0.001 to 0.035; (ii) mean linear flow velocity is from 0.5 to 2.5 ft/s (0.15 to 0.75 m/s); and (iii) temperature is maintained at least 20° C. below a temperature at which the polymerization initiator has a half-life of 1 hour; and
   (c) polymerizing the droplets in a reactor.

2. The method of claim 1 further comprising functionalizing the polymerized droplets as ion exchange resins.

3. The method of claim 1 in which the volume fraction of droplets is from 35% to 60%.

4. The method of claim 1 in which the harmonic mean size of the droplets is from 150 to 1000 microns.

5. The method of claim 4 in which the harmonic mean size of the droplets is from 150 to 500 microns; the ratio of droplet harmonic mean size to pipe diameter is from 0.002 to 0.022; and the mean linear flow velocity is from 0.5 to 1.8 ft/s (0.15 to 0.54 m/s).

6. The method of claim 5 in which in which the volume fraction of droplets is from 35% to 60%.

7. The method of claim 4 in which the harmonic mean size of the droplets is from 450 to 900 microns; the ratio of droplet harmonic mean size to pipe diameter is from 0.008 to 0.032; and the mean linear flow velocity is from 0.9 to 2.5 ft/s (0.27 to 0.75 m/s).

8. The method of claim 7 in which in which the volume fraction of droplets is from 35% to 60%.

9. The method of claim 1 in which the harmonic mean size of the droplets is from 150 to 900 microns; the ratio of droplet harmonic mean size to pipe diameter is from 0.002 to 0.032; the mean linear flow velocity is from 0.5 to 1.9 ft/s (0.15 to 0.57 m/s); the volume fraction of droplets is from 35% to 55%; and the droplets polymerize to form a styrenic polymer.

10. The method of claim 9 further comprising functionalizing the polymerized droplets as ion exchange resins.

* * * * *